ROBESON & NASH.
COMBINED CULTIVATOR AND SEEDER.
No. 108,833. Patented Nov. 1, 1870.
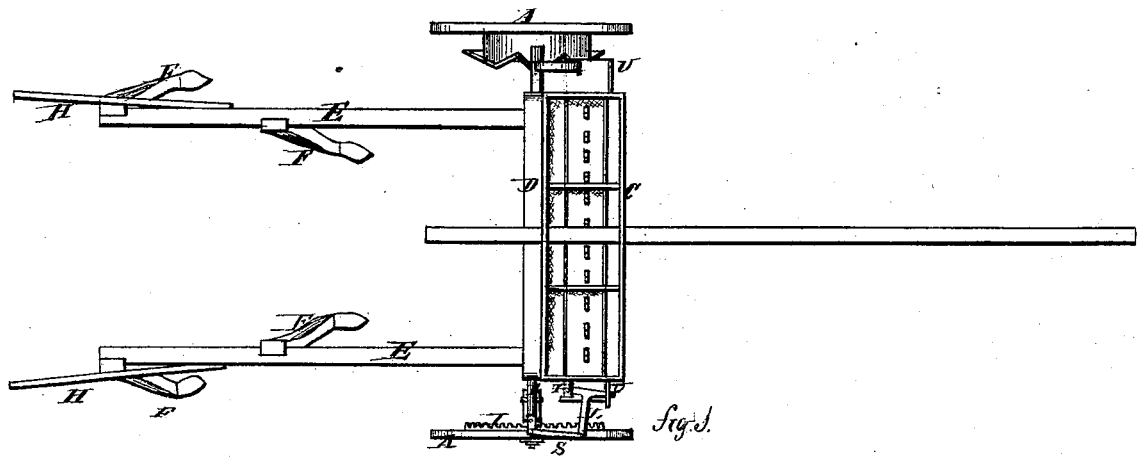
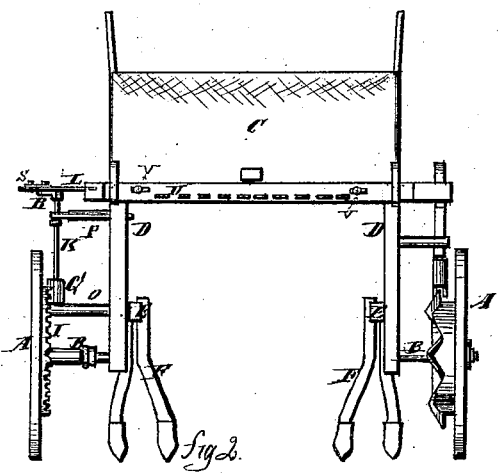

United States Patent Office.

ROBERT I. ROBESON AND WILLIAM NASH, OF OSKALOOSA, IOWA.

Letters Patent No. 108,833, dated November 1, 1870.

IMPROVEMENT IN COMBINED CULTIVATORS AND SEEDERS.

The Schedule referred to in these Letters Patent and making part of the same.

We, ROBERT I. ROBESON and WILLIAM NASH, of Oskaloosa, in the county of Mahaska and State of Iowa, have invented a certain Improvement in Combined Cultivators and Seeders, of which the following is a specification, reference being had to the accompanying drawing.

Nature and Object of our Invention.

Our invention relates to the combination of the seed-box C with the bow cross-piece D and wheels A in such a manner that the seed-box is elevated above the corn when the machine is used as a cultivator.

We adapt a cultivator that is largely in use as a cultivator to a new use, that of sowing grain, by simply combining with it a seed-box, C, at an expense of a few dollars.

Description of the Drawing.

Figure 1 represents a top or plan view of our machine; and

Figure 2, a front elevation.

General Description.

A are the wheels of the cultivator; and

B, the spindles on which they turn.

D is an elevated cross-piece connecting the spindles B of the wheels. It is elevated for the purpose of straddling a row of corn.

E are plow-beams, pivoted to the cross-piece D, as shown.

F are the ordinary plow standards and plows; and

H, the handles.

I is the rack attached to the wheel A so as to revolve with it.

K is an upright shaft, with a step on the piece O and a bearing in the piece P.

Q is a toothed wheel rigidly attached to the shaft K and engaging with the rack I.

R is a crank rigidly attached to the shaft K and connected with the lever L by the rod S.

The lever L is pivoted at T, and is so connected with the slide U in the seed-box C as to vibrate it, as hereafter described.

The slide U may be placed either in the bottom of the seed-box or on the front, as shown in fig. 2.

V are set-screws for adjusting a strip beneath the slide U, so as to regulate the size of the seed-openings to sow the seed at any desired capacity.

We have a simple, cheap machine, that can be used by the farmers for sowing small grains and then for cultivating their corn, and the cultivators of the kind herein shown that are already in use can be made into a combined machine by simply making the attachments of the seed-box and the device for operating the sowing-board U.

What we claim, and desire to secure by Letters Patent, is—

The combination of the seed-box C, the bow cross-piece D, spindles B, and wheels A, when the seed-box is elevated on the cross-piece to avoid the necessity of removal to cultivate corn, and the whole are constructed and operated as described.

ROBERT I. ROBESON.
WILLIAM NASH.

Witnesses:
M. T. WILLIAMS,
H. P. NINDE.